Figure 22:
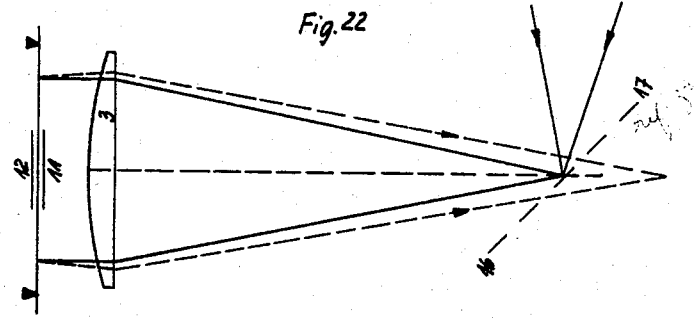

May 2, 1933.  C. MUELLER  1,906,803
MEANS FOR CONTROLLING RADIATIONS
Filed March 20, 1930   8 Sheets-Sheet 1

Inventor
Carl Mueller,
atty.

May 2, 1933. C. MUELLER 1,906,803
MEANS FOR CONTROLLING RADIATIONS
Filed March 20, 1930 8 Sheets-Sheet 2

May 2, 1933.  C. MUELLER  1,906,803
MEANS FOR CONTROLLING RADIATIONS
Filed March 20, 1930  8 Sheets-Sheet 3
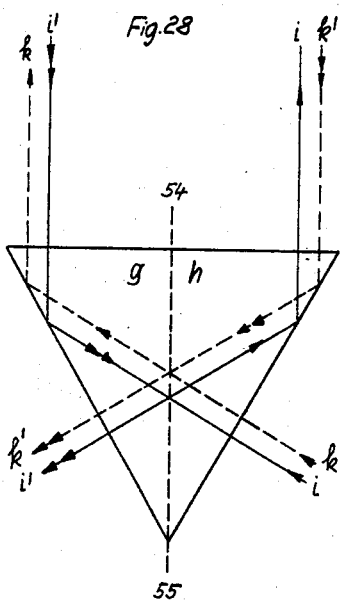
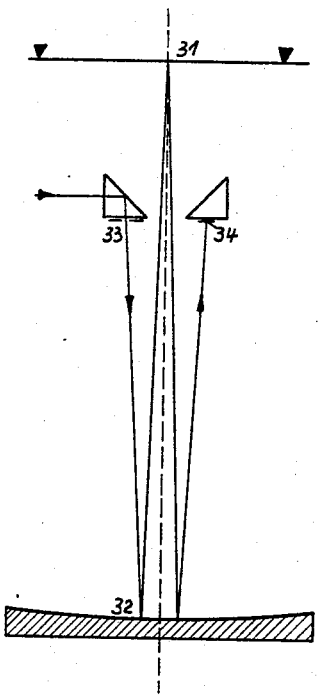
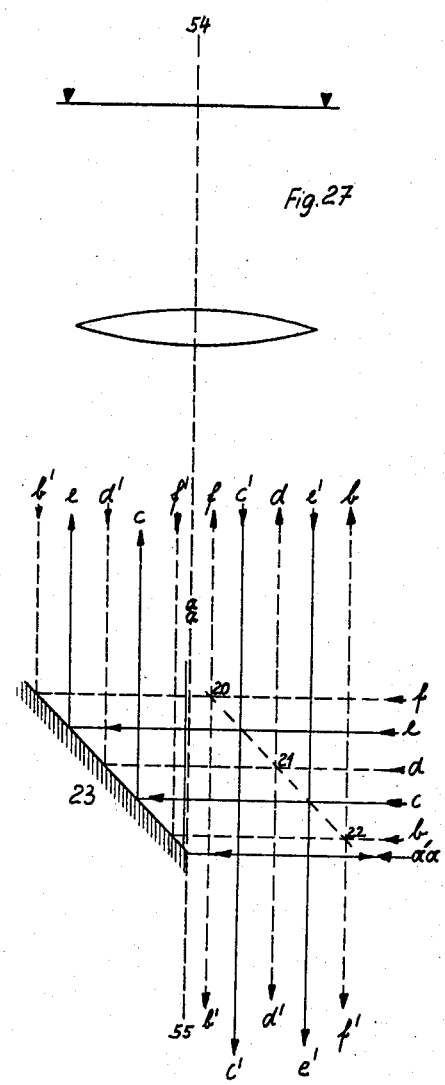

May 2, 1933.  C. MUELLER  1,906,803
MEANS FOR CONTROLLING RADIATIONS
Filed March 20, 1930   8 Sheets-Sheet 4
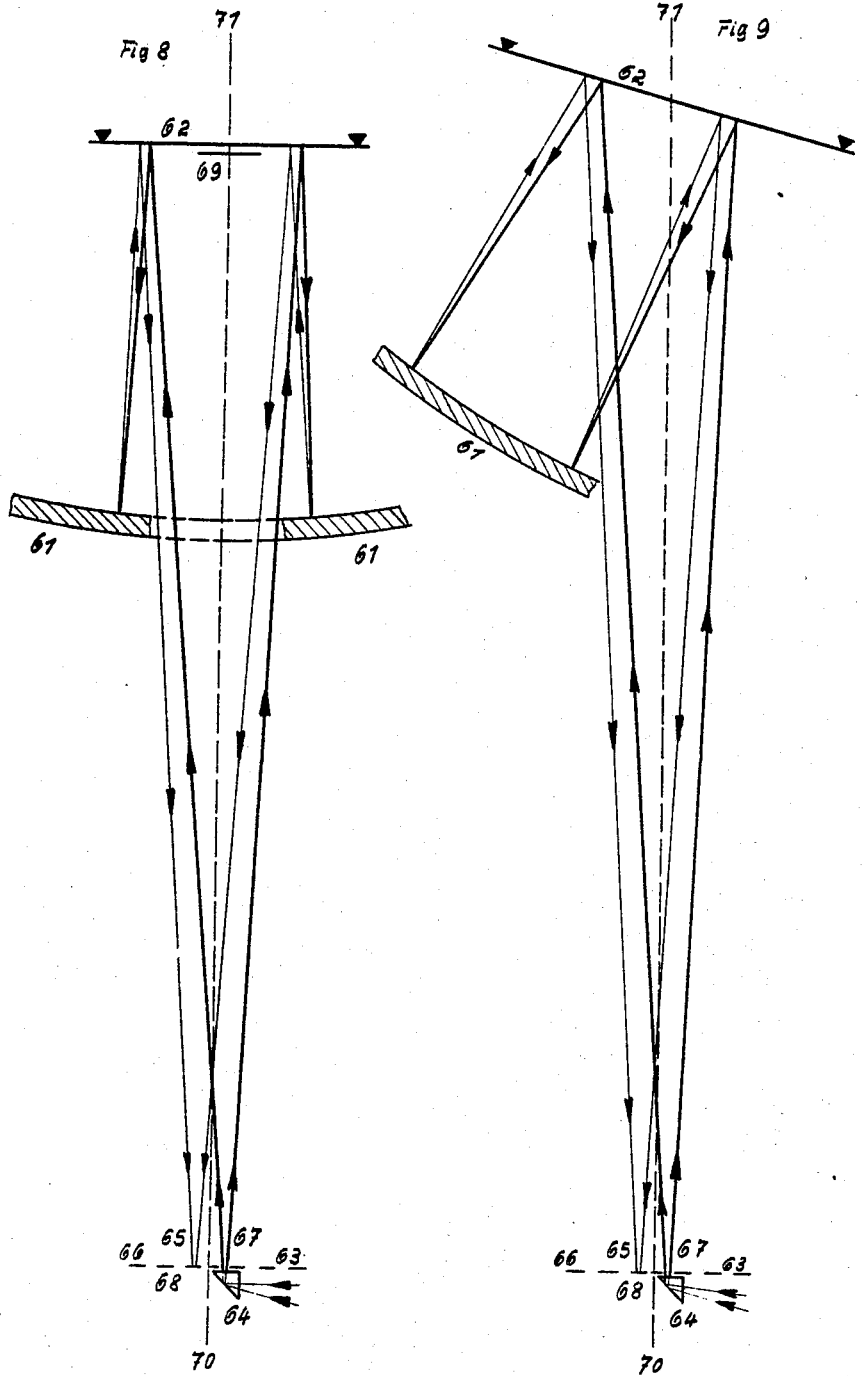
Inventor
Carl Mueller
By Hemingworth jr
att.

May 2, 1933. C. MUELLER 1,906,803
MEANS FOR CONTROLLING RADIATIONS
Filed March 20, 1930   8 Sheets-Sheet 5
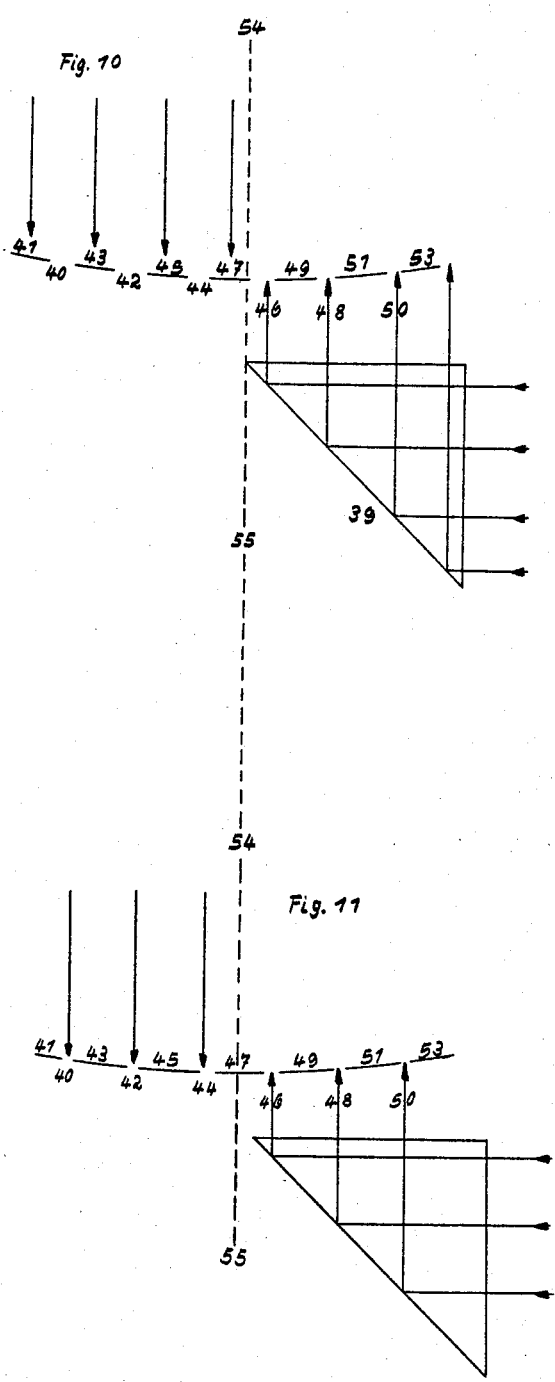
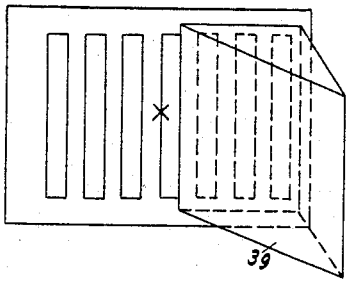
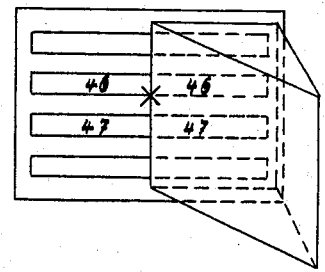
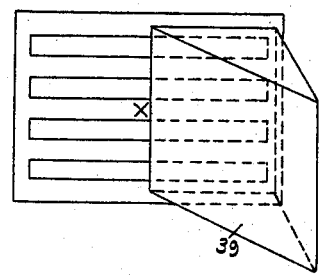
Inventor
Carl Mueller,
By Henry Orth
att.

May 2, 1933.  C. MUELLER  1,906,803
MEANS FOR CONTROLLING RADIATIONS
Filed March 20, 1930    8 Sheets-Sheet 6
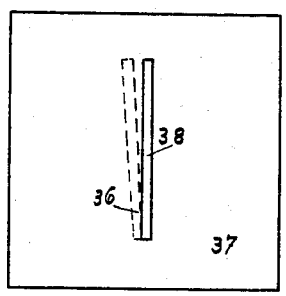
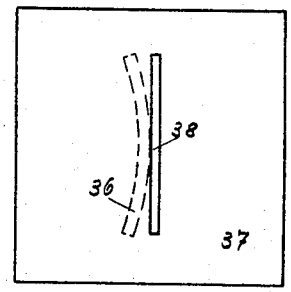
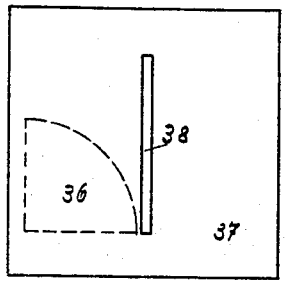
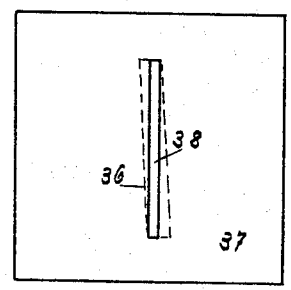
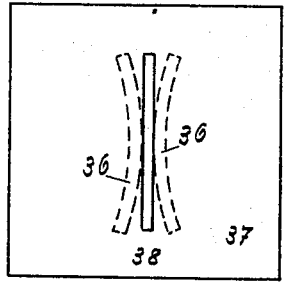
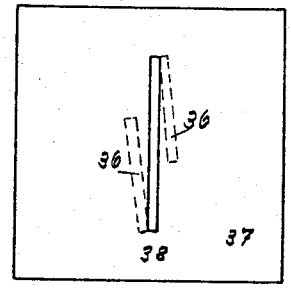
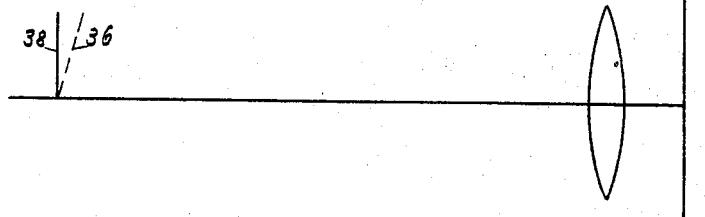
Inventor
Carl Mueller May 2, 1933.　　　　C. MUELLER　　　　1,906,803
MEANS FOR CONTROLLING RADIATIONS
Filed March 20, 1930　　　8 Sheets-Sheet 7

Inventor
Carl Mueller
By
Atty

May 2, 1933.  C. MUELLER  1,906,803
MEANS FOR CONTROLLING RADIATIONS
Filed March 20, 1930  8 Sheets-Sheet 8

Inventor
Carl Mueller
By

Patented May 2, 1933

1,906,803

UNITED STATES PATENT OFFICE

CARL MUELLER, OF BERLIN-CHARLOTTENBURG, GERMANY

MEANS FOR CONTROLLING RADIATIONS

Application filed March 20, 1930, Serial No. 437,431, and in Germany December 1, 1928.

An application has been filed in Germany December 1, 1928.

The present invention concerns a very sensitive arrangement for modulating radiation, particularly light, so that it can be used for picture-telegraphy, automatic code transmission, television, and for purposes of sound-optical or mechanical-optical, mechanical-electrical, and electrical-optical transformations, e. g. in the technology of talking movies; further, for purposes of making measurements, micro-photometer arrangements, technical purposes in movies, pictures etc.

All of these systems relate to converting forces and movements caused thereby into variations of radiations, and this conversion, according to this invention, is to be accomplished in particularly advantageous manner. For this purpose, according to this invention, in controlling radiations of all types, particularly for television purposes, wherein the position of the light beam is varied relative to the obturator by reflecting means, the arrangement is one wherein the light beam used, as a cross section in the shutter plane of the order of magnitude of the opening or screen of the obturator, the dimensions of which are also selected so that a slight variation of the position or cross section of the light beam produces a great variation in the light intensity of that portion of the light beam which is screened or unscreened.

It has been proposed (see Friedel, Fernsehen, p. 127, Fig. 122) that the changing convexity of a telephone diaphragm be used to modulate light by reflecting a parallel beam of light from the mirrored surface of the telephone diaphragm in such a way that the middle portion of the beam passes freely through a hole in a perforated obturator. If, now, the telephone magnet is excited by a current, the mirrored diaphragm is bent so that the path of the rays after reflection is convergent. This causes a larger portion of the light to go through the opening in the obturator. The fact that a certain amount of light passes always through the hole in the obturator, even under condition of no-current flow, has the big disadvantage that the point of reception (i. e. the photoelectric cell, photographic film, or whatever is used in connection with the apparatus) is constantly covered by an evenly distributed light which destroys all fine differentiations.

Another disadvantage is the fact that the modulation of large light intensities requires very large changes in the convergence of the reflected parallel beams. This means that large forces are necessary to cause the corresponding large changes in convexity of the diaphragm.

Figure 6:
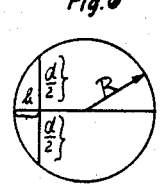
Figure 5:
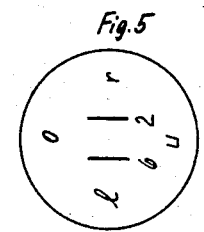
Figure 1:
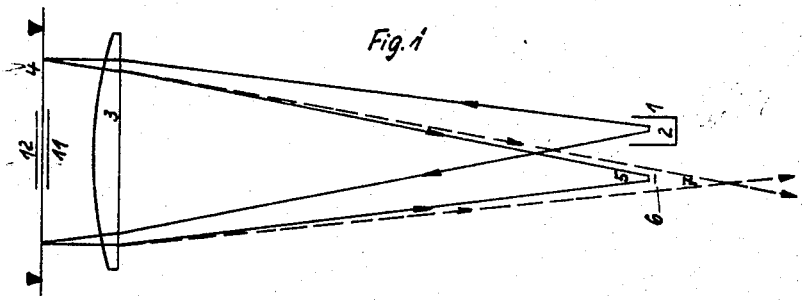
Figure 2:
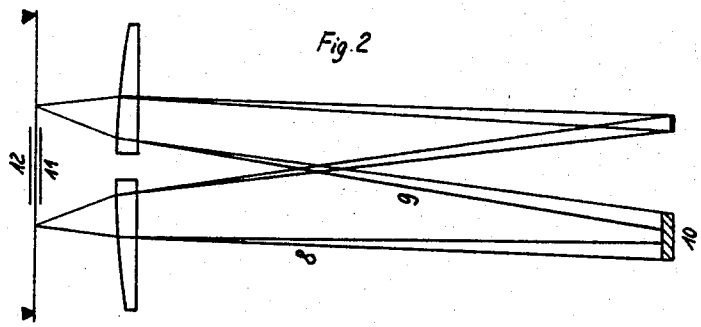
Figure 3:
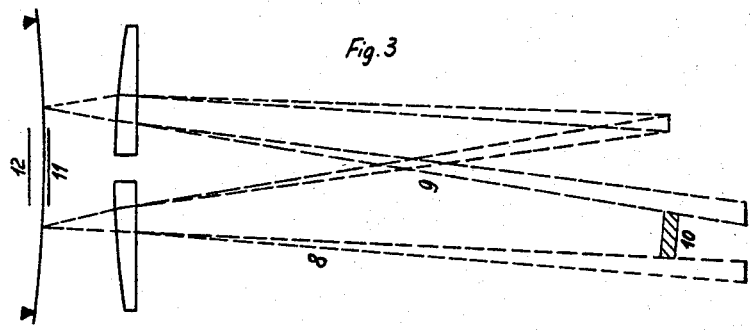
Figure 4:
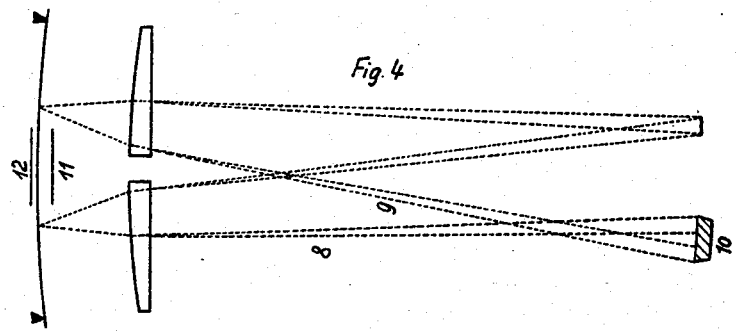
Figure 30:
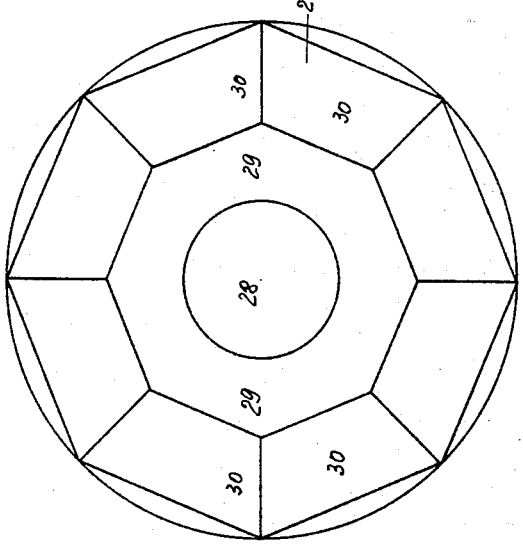
Figure 29:
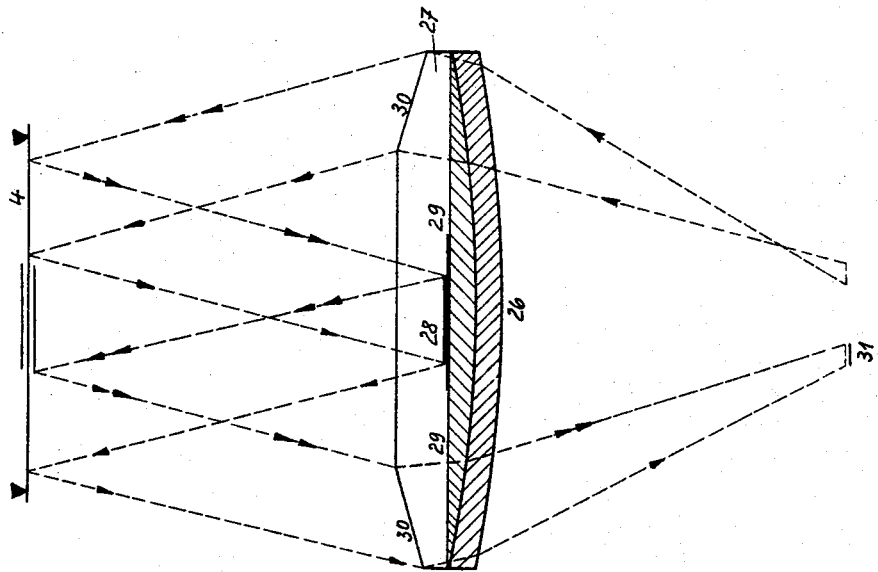
Figure 31:
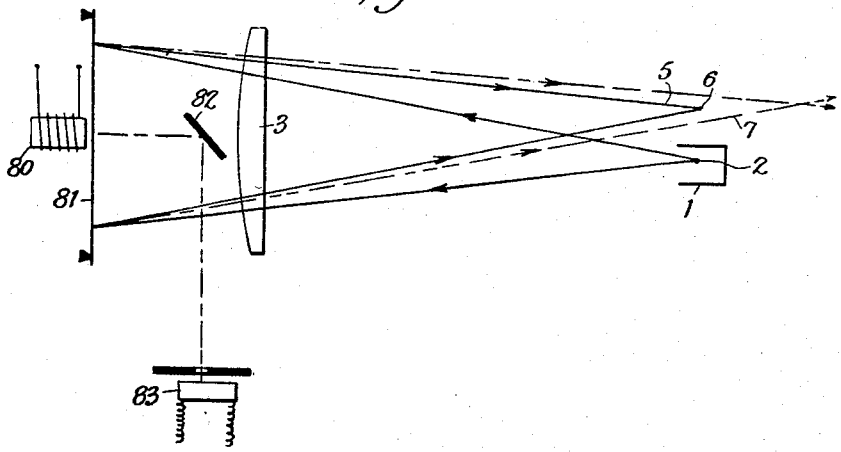
Figure 32:
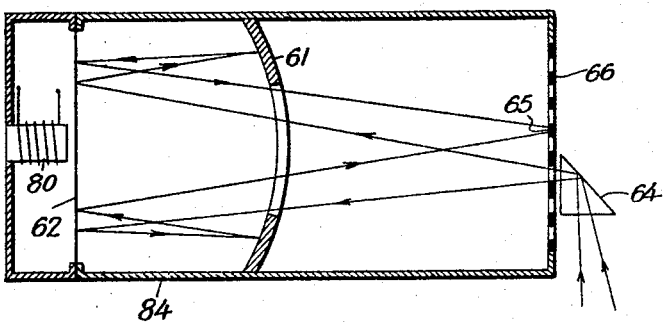

The drawings show, for example, several diagrammatic embodiments of the invention with the use of a convergent ray beam and Figs. 2 to 4 show modifications of the arrangement of Fig. 1, wherein use is made of two separate light beams. Figs. 5 and 6 show the curvature and reflection ratios of a mirror diaphragm. Figs. 7, 8, 9 show three arrangements with multiple reflection by means of a concave mirror. Figs. 10 and 11 show an embodiment of the invention with the use of light-permeable (translucent) grids. Figs. 12, 13 and 14 show details of grids for subdividing the light. Figs. 15 to 20 show several embodiments of light beam cross sections in cooperation with a slot obturator. Fig. 21 shows an arrangement with different inclinations of obturator and light line. Fig. 22 shows a light control arrangement with a fine subdivision of the ray beam coming from the light source. Figs. 23 to 26 show various embodiments of mirrored grids. Fig. 27 shows a light control arrangement with the use of a mirror grid and a stationary mirror surface. Fig. 28 is a detail showing of a mirror grid formed of two assembled prisms. Fig. 29 shows the use of an objective or lens diverting the rays with different inclinations with a light control of the invention. Fig. 30 is a plan of this lens, and Fig. 31 is a diagrammatic illustration of an arrangement somewhat similar to Fig. 1, but showing actuating means for a reflector and means for deviating and utilizing a portion of the beam. Fig. 32 is a diagrammatic view showing the control and image forming mechanism enclosed in a gas tight casing.

Figures 1 to 2 illustrate by several sketches, how, in the present invention, an essentially more sensitive modulation of light can be accomplished without the above short comings. In the present invention, a wide parallel light beam is not projected on an aperture obturator, but instead an image of a small-dimensioned or finely divided light source is formed on a similarly shaped screen, aperture, or slit obturator by the use of a reflecting diaphragm. In this case a minimum amount of change in the image width or lateral displacement of the image caused by deflections or a small bending of the reflection diaphragm, is sufficient to deviate a large portion of the focused light beam around the edges of the screen obturator or the opening in the aperture obturator.

In the arrangement in Fig. 1 a hooded electric lamp 1, having a thin, straight filament 2, which is perpendicular to the plane of the drawing, is the emitter of the light which is to be modulated. It is placed near the focal point of the achromatic lens 3, and somewhat to the side of the axis of the lens. The nearly parallel light rays which issue from lens 3 fall on an elastic, plane mirror-diaphragm 4, which is placed approximately normal to the axis of the lens. This mirror-diaphragm reflects the rays back into the lens arrangement in such a manner that an image 5 of the lamp filament is formed to one side of the actual filament, and near to the focal point of the lens. At the position of the narrow filament image 5 there is placed a blackened, opaque, strip-like obturator 6, having the same width as the image. This strip obturator screens off and intercepts the incident converging light beam when the reflecting diaphragm is in the normal position of rest. (Approximate equality of size of light source, image, and obturator is not necessary.) For many cases an enlarged or diminished image offers advantages in adjustment, manufacture, or operation.

If, through any kind of force action, the plane reflecting diaphragm 4 is deformed, for example bent convexly toward lens 3, the total focal length, which is determined by the diaphragm and the lens, is thereby changed, and hence also the cross-section (image width) of the light beam. The light rays now meet at a distance farther from the lens as shown by the broken lines of Fig. 1. As a result, a greater part of the rays incident upon the strip-like surface 6, pass by the edges. The portion of light passing obturator 6 evidently becomes larger, the stronger the bending of the diaphragm and the greater the widening of the image. The concentration of the light rays for the purpose of radiating optical-electrical relay devices, or for use in connection with a sound track for talking movies, or for producing a point image for microphotometer purposes, and the transmission of pictures by telegraph, can be accomplished by well-known auxiliary optical means. In order to produce a point image for registration purposes, a cylindrical lens is placed before the obturator 6.

As a more careful consideration shows, the quantity of light which passes by the obturator strives for a limit (maximum value) when the image width is considerably increased (or decreased), and this limit is characterized by a very small percentage loss due to the light intercepted by the obturator. In the case of large increases or decreases in the image width, the cross-section of the beam at the position of the obturator quickly becomes so large that the part of the light caught by the obturator is practically negligible, and almost all of the light goes past undiminished. (Limit-maximum light intensity). For many special purposes the asymptotic characteristic of this modulation curve may be advantageously used. For instance, it may be used to compensate for the quadratically increasing forces which occur when the diaphragm is bent and modulated by magnetic forces, or to prevent overloading of the diaphragm.

It is obvious that changes in intensity can be varied greatly by changing the form of the obturator with respect to the image of the light source, e. g., by making the obturator assume the form of the cross-section of a lens or making it wider in order to insure a complete interception of light in the dark position even by a very strong bending of the reflecting diaphragm.

Generally, the obturator and image of the filament will be so adjusted with respect to each other, as is done in other light modulating apparatus, that a medium light intensity is obtained when the reflecting diaphragm is in the normal position. In the present arrangement this condition can be obtained, for instance, by adjusting the obturator 6 relatively so much nearer to the reflecting diaphragm that only about half of the incident light beam is intercepted at this point when the reflecting diaphragm is in its normal position. (See the dotted lines in Fig. 1.) A concave bending of the reflecting diaphragm away from the lens now causes a shortening of the focal length and a strong convergence of the light beam at the position of the obturation, and hence an increase in the loss of light caught by the intercepting obturator, i. e. a decrease in brightness. On the other hand, a convex deflection of the reflecting diaphragm has a diverging effect on the light beam, in which case a diminution in the intercepted light occurs, and an increase in brightness is obtained.

A well-known danger which occurs when using the Kerr cell or interference methods for modulating light is the fact that it is possible to so overload the apparatus that the dark spot or the light spot is shifted, thus causing uncontrollable modulation. The "dark spot" is the condition which obtains when the image size exactly fills the obturator 6, Fig. 1, i. e., when no light passes beyond. The "light spot" is the condition which obtains when the image size exactly fills the slit in an aperture obturator so that maximum brightness obtains beyond. According to the principle of light modulation used in the present invention, such uncontrollable modulation caused by repeated decreases need not be feared. But safety against over-modulation of the dark spot can be easily obtained. A method for carrying this out is represented in Figures 2, 3 and 4. This improved arrangement is obtained by cutting the lens across a diameter and separating the two halves of the lens as shown in Fig. 2. Or an equivalent optical method may be used instead: for instance, the insertion of two prisms or of two slanting glass plates, or by grinding the plane surface of a lens so that a slight diverting biprismatic effect is obtained. Whatever the means employed, two oppositely diverging pencils of rays 8 and 9 are formed which, when the reflecting diaphragm is in the normal position, fall directly on the edges of a wide obturator and are there intercepted. (See Fig. 2.) As before, deflections of the reflecting diaphragm which produce an enlargement in the width of the image cause the light to pass around the edges of the obturator (dotted rays, Fig. 3). On the contrary, when the image becomes narrower as shown in Fig. 4 (smaller focal length) the rays are entirely intercepted as in Fig. 2.

The sensitivity of the arrangement as here given can be singularly increased by choosing much smaller filaments and obturator. Assume, for example, that the objective lens and membrane both have an aperture $d=20$ mm., that the objective focal length is 100 mm., and that the filament and its obturator both have a width of 0.1 mm. A deflection of the diaphragm in the center equal to $h=1/1000$ mm. gives then, as is obvious from the diagram Fig. 6 for the radius of curvature R of the diaphragm the relation $h(2R-h)=(d/2)^2$ or $R=100/2\times0.001=$ 50,000 mm. The focal length of such a mirror is known to be R/2, hence is 25,000 mm. If the light rays coming from the lens onto the mirror diaphragm are parallel, the resulting focal length F of the lens and mirror combination is calculated from the focal length of the lens $F_1$ and the focal length of the mirror $F_m$ according to the well-known reciprocal relation $1/F=1/F_1+1/F_m$. If the mirror is plane, $F_m$ is infinite, hence $1/F_m=0$, that is $F=F_1$; or for a lens 20 mm. in diameter and having a focal length of 100 mm.; the image distance and total focal length will be $F=100$ mm. In case the mirror diaphragm assumes a focal length $F_m=-25,000$ mm., which, according to the above calculation, would result from a convex deflection of 1/1000 mm., there results $1/F=1/100-1/25000=249/25000$ or $F=100.4$ mm. This means that the image distance in this case is increased by 0.4 mm. Since the ratio of the apertures in the above example is 1:5, such an increase in the displacement of the image (0.4 mm.) from the original position of the image (position of the obturator) causes a widening of the pencil from about 0.08 mm. to 0.18 mm. About half of the cross-section of the light pencil will now be intercepted by the 0.1 mm.— wide obturator. A slightest displacement of the diaphragm therefore, causes a great increase in the percentage of the reflected light to pass by the intercepting obturator. With larger image widths and focal lengths, and finer line sources and obturators, the order of the sensitivity approaches that obtained by modulating light by interference methods.

Tests made by the writer have shown that the necessary deformations of the diaphragm can be produced by quite small forces. In case the reflecting diaphragm is controlled by the effect of electrostatic forces, less than 1/15 of the electrostatic biasing potential and impressed potential, which the considerably more expensive Kerr cell requires, is sufficient.

Suitable diaphragms having highly plane metallic reflecting surfaces of excellent fineness, for example the diaphragms made for the first time by the writer from suitable hard, light materials capable of high elastic extension (small modulus of elasticity) and without residual deformation, were chosen; furthermore, diaphragms were made from organic and inorganic materials with a reflecting coating, e. g. celluloid, artificial resin, rubber-like materials, glass, mica, and thin skins of metallic, inorganic compounds, e. g. a diaphragm made by the oxidation of aluminum, with a reflecting coating etc.

Another advantage of the present method of forming the image is the fact that one may use a beam of light having a larger aperture. This accordingly makes it possible to use a large proportion of the light, even if the sensitivity of the modulation is high. In contrast to Schröter's highly sensitive light modulation by means of interference fringes, there is in favor of the present method the following essential advantage: 1st: white light may be used. 2nd: Smaller losses in light intensity. 3rd: This method of forming the image (in case it is not pushed to the limit of sensitivity) does not demand such good optically plane mirrored surfaces. 4th: The sensitivity is adjustable because one can use light sources and intercepting obturators of various widths.

In the obturator arrangement, which has been considered up to the present, the pencil of light falls upon a screen obturator placed at the point of smallest cross-section of the light beam (position of the image of the filament), if the reflecting diaphragm is in the normal state (undeflected form). On the other hand, the light may also pass through a small slit. Varying the image width then leads to changes in the light intensity back of the diaphragm. Also here, in contrast to the old arrangement mentioned on p. 127 by Friedel in his book Fernsehen, it is possible to attain complete modulation of an unlighted path. This may be done as is shown in Figs. 1 to 20, if one uses the further trick, as is done in this invention, of blanking out, (e. g. by an objective, reflecting membrane diaphragm or something of that nature), the middle of the light pencil which is only slightly modulated.

Another possibility is to focus in the dark spot two separated filaments, one on the left side and one on the right side of the slit in the obturator, by an arrangement similar to that illustrated by Figs 2, 3 and 4.

It is obvious that for sensitive light modulation the changes in slope which the various parts of the surface of the reflecting diaphragm make with each other are important. The outer edge and the center portion of the diaphragm are quite ineffective as regards the modulation of the light and hence are not used, because they do not deflect the light sufficiently from the mean position. The most important parts of the diaphragm are the parts which undergo the greatest deflection from the mean position. A more exact consideration shows (discussion of Fig. 5 follows below) that the actual modulation of light is produced mainly by the horizontal parts lying near the center of the reflecting diaphragm, when a one-dimensional vertical light source is used with the appropriate obturator system. On the other hand, the upper and lower halves of the diaphragm have only a slight effect. In schematic Fig. 5, which shows the reflecting diaphragm in the direction of the lens axis, the particularly effective parts of the mirror are labeled $r$ and $l$. The filament is 2, and 6 is the obturator on which the image falls. The deviation of the light beam, which is caused by the movement of the upper and lower edges $o$ and $u$, cause only small changes in light intensity, because such movements cause only a change in the cross-section of the beam in the direction of the long axis of the filament image. The small modulation of the slightly converging center portion of the light beam and its disturbing effects when used in conjunction with a slit obturator have already been mentioned.

A later form of the apparatus was improved by using these ineffective parts of the reflecting diaphragm for other purposes than reflection, e. g. particularly for activating the diaphragm as described below.

In schematic Figs. 1 to 4 there is shown an auxiliary electrode 11 in the form of a circular disk or a vertical strip of metal, which is placed before the slightly effective reflecting parts (i. e. before the center of the diaphragm or before the whole vertical middle section of the diaphragm). It is also parallel to the diaphragm surface, and is blackened on the side toward the lens. A similar auxiliary electrode 12 is placed behind the diaphragm.

If electrodes 11 and 12 are charged so as to have opposite potentials, (e. g. $+100$ v. and $-100$ v. respectively) their action coöperates so that when the diaphragm is subjected to positively or negatively applied potentials in the form of impulses, the diaphragm experiences a movement or attraction toward one or the other of the auxiliary electrodes, similar to the well-known case of the string electrometer or condenser telephone. The double electrode arrangement shown in sketches 1 to 4 produces a linear relationship between the controlling potential and the movement of the diaphragm, and very high sensitivity. It must also be noted that with the present methods one may obtain considerable sensitivity with but one single auxiliary electrode; particularly, if one applies between the diaphragm and the auxiliary electrode a fairly large biasing electrostatic potential which is changed by the modulating potential. In this case the bending of the diaphragm and the modulation increase, as is known, more than the modulating potential. This characteristic can be used to advantage in various ways, e. g. to compensate the slower increasing of the light-current curve (by an increasing intensity of exciting light) of a selenium cell and thallium-oxysulfide cell when used as light relays.

In place of the electrostatic control, such as that of a condenser telephone, the diaphragm may also be controlled by magnetic or electromagnetic forces, or mechanical or acoustical means of different kinds, as has been suggested for modulating by interference mirrors. These controlling devices, e. g. control magnets or coils, would, of course, be placed before the less useful parts of the diaphragm. An acoustical control of the movement can be obtained with advantage, for example, by placing a short distance in front of or behind the diaphragm a telephone diaphragm. One can, for instance, place a magnetically controlled telephone diaphragm in the space directly back of the reflecting diaphragm in such a way that the space between the two diaphragms is totally or almost closed. Vibrations of the telephone diaphragm, which are caused by the voice currents, (i. e. for purposes of telephony by a light beam), act on the air cushion, and by its help transmit the vibrations to the reflecting diaphragm. In this way modulated light, which is proportional to the original voice current and sound frequency, is obtained. In contrasting this with the Kerr cell arrangement for modulating light, this arrangement has the advantage, which is particularly valuable for military purposes, that the combination of such a reflecting diaphragm with a simple telephone needs no high auxiliary potentials. It is, furthermore, of importance to note the possibility of adjusting the air cushion between the two diaphragms so that the motion of the air transmits the disturbances caused by low frequencies less effectively than those caused by high frequencies, thus affording a means of compensating for the disturbances caused by infra-red sensitive receivers, e. g. selenium cell, thallium-oxysulfide cell, according to United States patent of T. W. Case, No. 1,316,350, and types of bolometer apparatus. It is obvious that such problems may also be solved by giving the telephone and reflecting diaphragms such a tension that a compensating dependency of frequency is obtained. (The possibility of arranging in front of and behind the reflecting diaphragm two telephone diaphragms working in opposition, or some similar arrangement, may also be mentioned.) By transmission of the impressed frequency by means of an air cushion or an equivalent elastic gas or liquid one obtains an important security in operation, in so far as strong changes in the form of the telephone diaphragm can not cause immediate overloading of the reflecting diaphragm.

Moreover, researches made in sound by the writer have shown that light modulation by means of a thin reflecting diaphragm can be made so sensitive that tones sung in a room cause large modulating effects. The present arrangement can accordingly be used with advantage as a direct acoustic-optical microphone (e. g. for recording sound tracks).

In the illustrations shown in Figs. 1 to 4 those portions of the light which fall on the parts of the diaphragm which are least effective in producing modulation are destroyed by blackened parts, control apparatus, etc.

An additional idea of the inventor is that these slightly modulated portions of the light beam can be reflected out to the side, by placing a mirror at an angle between the objective and the reflecting diaphragm and this reflected light may then be used in connection with control or compensating apparatus. One can for instance, in this way determine the most favorable adjustment for the light source, reflecting diaphragm, and intercepting obturator. Moreover, these slightly modulating portions of the light beam may also be used in conjunction with compensating apparatus, e. g. a compensating photo-electric cell to eliminate variations in the light intensity of the light source (e. g. by using a circuit such as Koch, and also in this connection, Schröter and the writer have used for such purposes) or according to the Telefunken patent for producing positive pictures for photo-telegraphy.

In the apparatus illustrated in Fig. 31, numeral 81 indicates a reflecting diaphragm which is affected by electromagnet 80 positioned adjacent thereto. The central portion of the beam reflected from diaphragm 81, which is less affected by bending of the diaphragm by magnet 80, impinges upon an angularly disposed mirror 82 and is reflected laterally into association with a selenium cell 83 or other similar device, which will be affected thereby and which may be used for other control or compensating purposes.

In the arrangement described the rays incident on the reflecting diaphragm and then reflected from it pass through the same lens. However, there is the possibility of using separate optical systems for the incident and reflected rays, if the angle of incidence is large. In case the angle of incidence is made very large the sensitivity of the modulation can be greatly increased.

In place of the schematically represented simple lens, objectives with special corrections are used, especially for arrangements employing high light intensities, (e. g. telescope, microscope and cinematography objectives). Moreover, according to well-known optical laws, a concave mirror in place of a lens may be used to form the image. If the optical system is made up entirely of mirrors, a much more sensitive dark position is obtained than when lenses are used, because of the absence of chromatic aberration in the mirror image. For, very narrow and extremely precise obturator and focal points are necessary in order to attain a high sensitivity in modulation and perfect interception of light in the dark position. Even small remaining flaws in the recombination of the dispersed rays cause considerable disturbance, because they go by the edges of the obturator when the image is focused on the obturator and prevent a perfect dark position.

Representative examples of arrangements illustrating projection by means of concave mirrors are given in Figs. 7, 8 and 9. In the above connection only Fig. 7 need be explained for the present. In Fig. 7, 32 represents the concave mirror used instead of the lens for forming the image, 31 the plane reflecting diaphragm, 33 a slit illuminated by means of a reflecting prism, and 34 the image obturator on which the image of the slit 33 is projected. The light which, due to light modulation, passes the image obturator 34 as a result of the widening of the image is reflected sidewise to the right by a second reflecting prism lying behind the obturator. The slit 33, which serves as the light source, and the obturator 34 are located approximately at the principal focus of the projecting concave mirror so that the rays incident upon the diaphragm 31 are parallel, as was the case with the lens projection arrangement represented in Figs. 1 to 4. Moreover it is advantageous to place the slit and obturator for this purpose so that their long axes lie in the same straight line, for then the spherical aberration of the concave mirror is the least disturbing.

In the previous illustrative examples the light source has had the form of a line filament. The total light emission of such a line filament is naturally limited and is insufficient for the more intensive illumination and modulation as is necessary for instance for technology of motion pictures, modulation of light, projective television or relay arrangements for the control of high current circuits. Principles of the present invention can also be used to special advantage with stronger light sources (in the form of high candlepower incandescent bodies, arc lamps, gas-filled discharge tubes, etc.) which are required to produce the necessary brightness for the purposes just mentioned. This may be accomplished by finely dividing the light source and using obturators which are divided so that they conform to the image of the divided light source. How this may be accomplished is shown in a few examples which follow.

Figure 24:
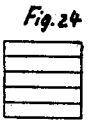

To obtain a finely divided light source or image, one can, for example, place numerous filaments beside each other in several combinations, for instance in the form of a wire net through which a heating current flows in all directions and which may have a form similar to that of Figure 24.

There is another possibility of breaking the light which comes from the light source into small parts by forming images, e. g. by the use of replica grating, lens grating, interference or refraction phenomena.

It is particularly easy to obtain a finely divided light source by forming the image of a light source (e. g. arc lamp or a lattice-like source of light on a transparent or reflection grating as shown in the accompanying explanatory Figures 10, 11, 12, 13, and 14.

As schematically represented in Fig. 10 an illuminated surface consisting of bright lines of light very close together may be obtained, for instance, by using a photographically made line grating. The enlarged and only partly drawn line grating, whose opaque lines are indicated by 41, 43, 45, 47, 49 and 51, is placed perpendicular to and symmetrical with the axis of the lens 55, 54 (and the plane of the paper) and goes through the focal point of the lens, i. e. the focal point of the combination of lens and reflecting diaphragm. The image of a projection lamp, for example, the incandescent electrode of a tungsten arc lamp or the like, is thrown on the right half of the line grating from the right with the help of the reflecting prism 39. A row of light pencils travels to the objective and diaphragm in the direction of the diaphragm as secondary light sources through the holes of the grating. This row of light rays act in their totality as a light source made from fine, straight-line filaments. A bright line image is formed from each bright line in the secondary light source after reflection from the reflecting diaphragm quite similarly as in the case of the single light beam of Figs. 1 to 4. If the reflecting diaphragm (e. g. plane) is normal to the axis of the lens, and the grating is so (see Fig. 10) placed that it is cut by the lens axis 55, 54 directly on the boundary between a transparent and an opaque line of the grating, then the transmitting line 46 of the right side of the grating is projected on the opaque line 47, line 48 on line 45, 50 on 43, and so on. This means, however, that in this slightly unsymmetrical position of the grating, all of the light pencils, which come from the transparent lines of the right side of the grating, are totally intercepted by the opaque lines of the left side of the grating after being reflected by the diaphragm. This is what occurred in the case of the single-beamed light source represented in Fig. 1.

If, however, a displacement of the reflecting diaphragm occurs, displacements in the image width and widening of the image result at the place of the intercepting grating lines 43, 45, and 47 for every pencil, exactly as in the case of the single light pencil of Fig. 1. Hence, there results a sidewise passage of light past the opaque lines through the transparent lines 40, 42 and 44 into the region lying behind, the amount of light passing depending on the extent of the diaphragm displacement.

If the above line grating is so shifted that the optical axes 54, 55 passes through an opaque line of the grating (or transparent line) as shown in Fig. 11, the transmitting lines 46, 48 and 50 of the right side of the grating will be formed as images on the lines 40, 42, and 44 of the right side of the grating. Hence, one has the case of a multiple slit-obturator which produces a modulation of light in the direction of decreasing brightness when a displacement of the diaphragm and a change in the image width occurs.

In the illumination of the grating in Figs. 10 and 11 the full length of the transparent lines on the right serve as light sources, and the full length of the opaque lines on the left as obturator. (Compare Fig. 12 which represents the grating as seen from behind in the direction of the optical axis 55, 54.) Advantageous in many respects are schemes for illumination such as that shown in Fig. 13 in which half of each transparent line is illuminated through the reflecting prism 39. The other half then serves as the image obturators. By means of this arrangement either a dark position as shown in Fig. 13 or a light position as shown in Fig. 14 can easily be obtained by a suitable shifting of the grating toward the optical axis which is indicated in the figure by the X-sign.

An especially simple, cheap, and also extremely precise method of forming the image of an illuminated grating and an arrangement for modulating light can be obtained in the following way: A simple spherical concave mirror 61 and a movable mirrored surface, (for example the reflecting diaphragm 62) can be combined as shown in Figs. 8 and 9. The light source to be projected, for example the grating 63 which is illuminated by means of a reflecting prism 64, is so placed near the optical axis 70, 71 of the concave mirror that the image approximately the same size as the object of the grating 63 is thrown on a corresponding grating 66 placed nearby. Since, in the case of an almost plane modulating mirror, the illuminated grating 63 and the grating image 65 together with the grating obturator 66 lie approximately at the middle point of the concave mirror 61, the image will be very precise; for the spherical mirror forms the image at the middle point without aberration (i. e. coma free) as is well-known. As a result of which, a much more precise image and dark position can be obtained by virtue of the lack of chromatic aberration of such a simple spherical concave mirror than can be obtained even with a costlier achromatic objective lens. Similar advantages in projection may be obtained by forming an image which has the same size as the object, if a deflected directing mirror is combined with a projecting concave mirror or if the image is formed exclusively by a concave mirror which acts as the modulating reflecting diaphragm.

The process of the light modulation is in other respects the same as in the above examples of the illuminated grating. For the sake of clearness a light pencil is shown for only a single transparent line 67 of the grating for the mirror arrangement of Figs. 8 and 9. The path of the light pencil is indicated by arrows. The returning light rays join on an opaque line 68 of the grating obturator 66. Bending, displacements or vibrations of the modulating diaphragm 62 cause displacements of the image of the grating with respect to obturator 68, and hence cause more or less strong passage of light around the intercepting line 68 of the grating. Instead of the grating here shown, whose lines are normal to the plane of the paper, a grating perpendicular to the optical axis can be used with advantage, in which case the lines of the grating lie parallel to the plane of the drawings.

In Fig. 8 the concave mirror 61 and modulating mirror 62 are symmetrically placed opposite each other. The concave mirror 61 has a hole suitably bored in the center; the center portion of the directing diaphragm, which is not very active for modulating purposes, is covered by a diaphragm 69 (as is shown in Figs. 2 to 4) which may again be used as a control electrode, etc.

In Fig. 9 the path of the rays passes by the edge of the concave mirror 61. The modulating mirror 62 is so inclined that radial pencils of rays are incident on the concave mirror 61 as shown in Fig. 8. Aberration free projection from the middle point is, then, also here insured. The inclined position of the modulating mirror 62 has, irrespective of the avoidance of having to drill the miror and of limiting the amount of incident light, a further additional advantage that, in the case of extremely oblique incidence the bending of the mirrored surface 62 gives essentially larger displacements of the image width, and therefore enhanced sensitivities in modulating action than was the case in normal incidence. (The relations here are similar to the method for determining the planeness of a surface by means of a spectrometer grazing incidence method described on page 305 of Kohlraush's Lehrbuch der practischen Physik (15th edition.)

In order to protect the mirror against loss in efficiency of reflection (decrease in reflection coefficient), it is enclosed in a case which is closed off by the adjustable grating plates 63, 66. By this procedure there is acquired at the same time the possibility of damping the motion of the modulating mirror by changing the internal gas pressure.

In Fig. 32, an arrangement similar to that of Fig. 8 is shown, in which the controlling elements are contained within a gas filled, air-tight casing 84. The elements within the casing are not affected by atmospheric conditions, nor subject to deterioration thereby. In order to damp the movement of movable elements the gas pressure within the casing may be varied to the required pressure to obtain the desired damping effect.

Instead of a surface mirror, one can employ mirrors whose reflecting surface is on the back side and which have suitable forms, e. g. a concave mirror 61 silvered on its back side, whose front and back sides are formed from concentric spherical shells. The incident rays are in this case radial.

In this connection there is to be noted the possibility of using the concave mirror 61 as well as the modulating mirror 62 to move the modulated light surfaces independently of the modulating action. In the case of a grating image, this can be done in the following way: A rotating motion (swinging motion) is imparted to the mirror in such a manner that the grating image, which is thrown from the mirror to the grating obturator, is shifted in the direction of the grating lens, whereby the interception of light on it remains unchanged.

When the peculiarities of the apparatus produce astigmatic projection, lines of a suitable obturator are placed in the corresponding astigmatic principal plane.

For the illustrative examples considered up to this point, the transmitting and intercepting parts of the grating (the grating used as the source and the grating used as the obturator) have formed a unit. For many purposes, however, it is more advantageous to build the source grating and the obturator grating so that they are separately adjustable. This is the case when it is desired to enlarge or diminish the images or to incline the lines of the source and obturator gratings to each other, as shown in Fig. 21, where 36 indicates the line of the source and 38 the line of the obturator.

The particular relationship between light directing which is brought about by placing a slit in an obturator at an angle to the filament image which is to be intercepted (see Figs. 15-21) is, in the general case, nearly the same as that of a simple slit obturator. In these figures the dotted line 36 is a bright image which is intercepted by a slit 38 in the obturator 37. Slit 38 lies at an angle to the image 36. As the image width is now increased, the cross-section of the beam will cover more of the slit in proportion to the amount of widening of the image. (Compare Fig. 16.) Accordingly, slit 38 appears as a line of light of greater or smaller length according to the amount of widening in the beam and light modulation. The length of slit illuminated will be increasingly sensitive to small changes in beam width, if the angle between the slit edge and image be made smaller. A similar effect may be produced by a deviation of the light beam by tipping the diaphragm. If in Figs. 17 and 18 one chooses to use a curved image or slit or both or an irregular cross-section for the beam 36, one may produce a very complicated relationship between light modulation and the accompanying length of illuminated slit. Further variations may be obtained by using combinations of several bright images, (e. g. in the way shown in Figs. 19 and 20, or further by giving the image and obturator different angles with respect to the reflecting diaphragm, Fig. 21), or by using a multiple slit obturator.

In the illustrative examples of Figs. 8 to 14 there is assumed an obturator grating and light source grating as the most contemplatable and immediate extension of Fig. 1. Their planes are arranged perpendicular to the axis of the lens. In the following examples it will be shown that by placing the gratings at an angle with respect to the optical axis, according to different considerations, a simplification of the apparatus as well as a more efficient use of light occurs.

In the arrangement represented in Fig. 22 the necessarily finely divided, radiating, light source is obtained by projecting a broad light source, (e. g. the crater of an arc lamp), from the right onto a reflection grating 16, 17 which is arranged at an angle at the focal point.

As a reflection grating one can use a grating ruled on a transparent material having a suitable temperature coefficient, so that it is not affected by the incident radiation. For instance, one may use a combination of two prims in accordance with Fig. 23. There the right prism has a line grating silvered on the hypotenuse, and the left prism is connected with an absorbing medium 19. The presence of this medium is necessary to absorb the radiation which is transmitted through the grating. (This procedure is similar to that used for observing sunlight.)

In the reflection grating arrangement in Fig. 22 a light ray is reflected from each line of the grating to the reflecting diaphragm, and thus becomes a secondary light source. The primary illuminating light, which comes from the arc lamp at the right and is transmitted through the transparent parts of the grating, continues on toward the left and is not effected by the reflecting diaphragm. The total number of reflecting lines, as far as it concerns the optical system (lens and reflecting diaphragm), acts again as a finely divided light source made up of many fine, straight filaments. If the optical axis of the apparatus (lens and reflecting diaphragm) as shown in Fig. 22 goes through the center of one of the reflecting lines, the light ray reflected from this line will be focused at the same spot after being reflected from the reflecting diaphragm. The optical-physical expression is "autocollimation." (Compare Lehrbuch der praktischen Physik by F. Kohlrausch, 15th ed., pp. 274, 285, 305, 313, and 328.) This central reflecting line acts at the same time as a screen obturator for the rays after reflection from the reflecting diaphragm. The images of the illuminated reflecting lines lying immediately to the right and somewhat back of the central reflecting line will be focused, according to well-known laws of geometric optics, to the left of the central reflecting line and closer to the lens. The images will according to the laws of geometrical optics, of course, be diminished and closer together. An additional idea of the inventor, in accordance with Fig. 22, is to arrange reflecting lines having the proper width at the position of the images as obturators. Moreover, the ruled left half of the reflection grating will be illuminated, (e. g. by an arc lamp), at the same time. On the account of the reversibility of the optical path, the images of the illuminated, reflecting lines on the left half fall, after reflection from the reflecting diaphragm, on the reflection lines of the right half of the grating, and these lines act for such images as obturators. Changes in the focal length and the image distances which the optical system (lens and reflecting diaphragm) experiences due to a bending of the reflecting diaphragm, cause in a way similar to that shown in Fig. 10 an increase in the beam cross-section and a general transmission of light through the transparent parts of the reflecting grating. A rotation of the direction of the grating lines through 90 degrees (similar to Fig. 13 in contrast to Fig. 12) is also applicable here.

Likewise, a change from the screen diaphragm adjustment to the slit obturator adjustment by a displacement of the grating or reflecting diaphragm is applicable.

If the expansion of the grating in the direction of the optical axis is small in comparison to the focal length, a moderately small and accurately ruled grating space may be used. On the other hand, there is a possibility of arranging the reflecting and screen gratings separately on both sides of the optical axis, and, moreover, to make the screen grating by photographic means.

With the parallel line grating like that shown in enlarged form in Fig. 24, only the side portions of the reflecting diaphragm are effectively used in directing light. (Similar to the case of a single slit.)

Figure 26:
Figure 23:
Figure 25:

A more effective use of the diaphragm can be obtained if ruled gratings, which consist of concentric circles, or better still a checkerboard pattern such as shown in Fig. 25 considerably enlarged, are used. Such a checkerboard pattern may be made by superimposing two ruled mirror surfaces as indicated in Fig. 26.

Distance between lines and line width need not be identical or uniform along one line or all over the grating, whatever the form of the grating. It is also possible to develop special light modulation curves by varying the form of the cross ruled grating, according to the principle of Fig. 25, e. g. to prevent faults onto interference or reflection phenomena.

With the arrangement for illuminating the grating as shown in Fig. 22, only about a half of the light reaches the reflecting diaphragm. In order to eliminate this fault, one may use the transmitted light from the primary beam in a similar way, i. e. it may be used by other gratings in the same or other apparatus or for auxiliary purposes, controls, compensation apparatus, etc. A particularly advantageous and simple method of using all the primary beam is shown schematically in Fig. 27. The reflecting grating designated by the three lines 20, 21, and 22 lies here a bit to the right side of the optical axis 54, 55. A total reflecting surface lies to the left of the optical axis and parallel to the reflecting grating. The transmitted light from the reflection grating is reflected from this auxiliary mirror 23 to the reflecting diaphragm. The reflection grating and auxiliary mirror 23 are placed so close to the lens that the point where the surface of the auxiliary mirror 23 cuts the optical axis coincides with the focal point of the optical system. The light path of rays $a$, $b$, $c$, $d$, $e$, and $f$ on the reflection grating may be seen more exactly in Fig. 27.

The ray $a$, which passes under line 22 of the reflection grating, is incident on the auxiliary mirror at the focal point, and is reflected along the optical axis of the lens and reflecting diaphragm system. Consequently, it will return along the incident path as $a'$.

The rays $c$ and $e$, passing through the transparent parts of the grating 20 to 21 and 21 to 22, are reflected by the mirror 23 parallel to and at different distances from the optical axis of the lens. By the symmetry of the optical system, $c$ and $e$ become the reflected rays $c'$ and $e'$, which again pass through the transparent parts of the reflection grating parallel to the optical axis. The ray $d$ incident on 21 from the right passes between $c$ and $e$, and is reflected from 21 parallel to the optical axis, and passes between $c'$ and $e'$, as shown in Fig. 27. The returning ray $d'$, which corresponds to $d$, passes between $c$ and $e$, is reflected from 23, and is incident upon the back side of the reflection line 21. Here it again suffers reflection, passes between $c'$ and $e'$, and passes to the space below where it can be used. In a similar way $b$ and $f$, after being reflected from 22 and 20, return as $b'$ and $f'$, and are reflected from the back side of 20 and 22 so that they can be used in the space below.

For the transparent lines or the reflecting lines, which operate on the same ray, (e. g. 22 and 20), the resulting image width corresponds to the ruling width or to the grating space. Consequently, the returning beam has at the focal spot practically the same width as the reflecting line or transparent line on which it is incident.

However, if one changes the image distance by bending the reflecting diaphragm, the reflected ray will, according to the above consideration, have a larger cross-section than the reflection lines and transparent lines on which it is incident. It follows, then, that only a portion of the returning rays $c'$ and $e'$ will pass through the transparent lines 22, 21 and 21, 20 to the useful space beyond. On the other hand, only the center portion of the widened, returning rays $b'$, $d'$, and $f'$ will fall on the reflecting lines 20, 21, and 22. The rest go through the transparent lines so that only a portion of $b'$, $d'$, and $f'$ is reflected to the useful space beyond. Accordingly, the arrangement of Fig. 27 modulates all of the modulated light.

If one uses a combination of prisms or something of that nature on which to deposit the mirror surfaces, one can compensate for any inequality in light path to the objective by suitable displacements in position or by the introduction of glass plates in the light path. One such mirror-grating combination in which the light paths are equal is schematically shown in Fig. 28. The reflection-grating is constructed here by putting two glass prisms $g$ and $h$ together. The prisms are made reflecting, and ruled on the contact faces; these reflecting (contact faces) surfaces are placed parallel to the optical axis 54, 55. The primary light rays $i$ and $k$ and the modulated light rays $i'$ and $k'$ intersect here at an obtuse angle. Otherwise, the light path and phenomena may be well understood from the above examples and Fig. 28.

For the illustrative examples considered up to this point, and for older methods, the projected light pencils experience only a single reflection and modulation on the diaphragm. To increase the sensitivity, however, it can in general impart to the light pencils a multiple reflection on the same diaphragm or different diaphragms. An illustrative example showing how at the same time the additional advantage of directing larger and more strongly converging light pencils may be obtained with a smaller diaphragm is represented in Figs. 29 and 30 by showing the schematic light paths. This is done for a single light source and obturator.

The objective lens 26, which projects the radiation of the diaphragm, is combined here with an auxiliary part 27 on the side next the diaphragm. This part, which has its slightly effective middle portion 28 blackened on the side toward the objective, is made reflecting on the side toward the diaphragm. The next ring zone 29, (which encircles 28), of the auxiliary part 27 is so ground that the rays which go out toward the diaphragm are parallel. The path of these rays is not shown, because this part works together with the diaphragm exactly in the same fashion as in the earlier examples. As shown in Fig. 30, the outer ring zone of the auxiliary part 27 is ground into facets so that here the portions of parallel light pencils are strongly inclined toward the center as they travel to the diaphragm. The inclination of these parallel rays is so chosen that, while they retain their properties as parallel rays, they are reflected on the edges of the reflecting diaphragm, and are next incident on the reflecting middle surface 28 of the auxiliary plate 27. From there they are incident on the edge of the oppositely lying reflective membrane, and finally, as the arrows show, pass through corresponding facet 30 to the objective so as to be projected on the screen diaphragm 31.

By virtue of the symmetry of the arrangement, the primary beam coming out of the oppositely lying facet on the left, follows the inverse path, being reflected twice from the membrane.

In addition to the increase in modulation due to the double reflection, there is the further important feature that these strongly predominant beams (due to the large surface which they pass through) from the facets have, with respect to the screen obturator, a big inclination toward the axis. Accordingly, an essentially larger increase in the image width and modulation occur.

As examples of further improvements and possible applications the following are given:

Swinging the diaphragm surface by unsymmetrically applied forces (e. g. forward, to the right; backward, to the left;) similar to that of a vibration galvanometer combination of several diaphragms for purposes of modulation and mutual force effects; application to light and color modulation with cinematographical apparatus; (with the large modulating energy here conveyable, it is possible to attain, by a quickly moving (inclining) stiff reflecting surface, used in the sense of this invention, a valuable economic advantage, in contrast to the present rotating obturator which is not economical on light). Further, there may be mentioned the possibility of using diaphragms with various cross-sections, texture, or material, e. g. with finely corrugated zones at the edges for the purpose of increasing the elasticity, and the use of reflection gratings, diaphragms and obturators which advantageously absorb, transmit, or reflect certain regions of the spectrum.

Such kinds of selective reflection gratings, diaphragms, and obturators, among others, can be used, (if, in case it is necessary, they are combined with suitable selective light sources or other means of separating colors), to eliminate undesirable kinds of radiation, (for instance, to prevent damaging effect of heat rays or the reverse), for purposes of optical telephony, (telephony of light beams) or to prevent the radiation of visible light in apparatus for automatic burglar alarms.

The present method of modulating light has many advantages particularly for infra-red telephony, in so far as the reflection coefficient for reflecting surfaces in thin sheets, according to the researches of the writer, is very high. The reflection coefficient retains high values even for such materials which are relatively poor reflectors in the visible, or easily experience a loss in their reflection coefficient upon being exposed to the air, (e. g. gold, silver, nickel, palladium, cadmium, aluminium, magnesium, etc. and their alloys).

This makes it feasible to not only use, for the modulation of infra-red radiation, exceedingly thin, highly elastic reflecting diaphragms, (e. g. in the form of the thinnest skins of gold, with or without a metallic backing or inorganic supporting sheet), but offers at the same time the advantage that the visible radiation is largely filtered out by virtue of the selective reflection coefficient. This is especially true if one consummates multiple reflections.

Instead of the circular diaphragms which have been used in the accompanying illustrative examples, one may also use any kind of a moveable reflecting surface which has any desirable form. This is particularly true when large modulating forces are used. For instance, non circular, comparatively rigid, or corrugated reflecting surfaces which one may clamp or hold partly in the edge, only in the center or near the center; or which may be held or clamped to a strip placed in a diameter or on two chords or to a ring near the center may be used. The many different kinds of vibrating surfaces, which are used in electromagnetic electrodynamic and electrostatic loud speakers etc. can also be used here if the surfaces are made reflecting.

Moreover, the present principle of light source division can be used with advantage for all light modulating schemes in which the modulation takes place by small changes in radiation.

What I claim is:

1. An arrangement for modulating radiations comprising in combination a source of radiation, movable reflecting means, a reflecting grating arranged so as to conduct a part of the radiation towards said movable reflecting means, further reflecting means for conducting the part of radiation passing through said grating means toward said movable reflecting means, means for actuating said movable reflecting means so as to vary the direction of the reflected rays, the relative position of this reflecting grating and these other reflecting means being chosen so that the reflecting grating works at the same time as intercepting diaphragm.

2. In a light valve in combination, a source of light, a reflecting diaphragm parallel to the light source for receiving light from the light source, a concentrating lens between the reflector and the light source, said light source located at one side of the lens axis, a light obturator at the conjugate focal plane of the lens, said obturator having a width substantially equal to the reflected light beam and means for deflecting the said diaphragm.

3. In a light valve in combination, a source of light, a reflecting diaphragm for receiving light from said light source, a light concentrating means for focusing the light from said reflecting diaphragm, a light obturator for receiving said focused light, said focused light beam and said obturator having a maximum width of 0.1 mm. and means for deflecting said diaphragm.

4. In a light valve in combination, a source of light, a reflecting diaphragm for receiving light from said light source, a light concentrating means for focusing the light from said reflecting diaphragm, a perforated light obturator, a perforation of said obturator located in the focal plane of said focused light, said focused light beam and the said perforation of said obturator having a maximum width of 0.1 mm., and a means for deflecting said diaphragm.

5. In a light valve in combination, a source of light, a reflecting diaphragm for receiving light from said light source, a light concentrating means for receiving said light from said reflecting diaphragm and reprojecting it on said reflecting diaphragm, a light obturator positioned for receiving said reprojected light from said reflecting diaphragm, and means for deflecting said diaphragm.

6. In a light valve in combination, a source of light, a reflecting diaphragm for receiving light from said light source, a light concentrating means for receiving said light from said reflecting diaphragm and reprojecting it on said reflecting diaphragm, a light obturator positioned for receiving said reprojected light from said reflecting diaphragm, said obturator and reprojected light beam having a maximum width of 0.1 mm., and means for deflecting said diaphragm.

7. In a light valve in combination, a source of light, a reflecting diaphragm for receiving light from said light source, a perforated light concentrating means for receiving said light from said reflecting diaphragm and reprojecting it on said reflecting diaphragm, said light concentrating means positioned between said diaphragm and said light source, a light obturator positioned for receiving said reprojected light from said reflecting diaphragm, said obturator and reprojected light beam having a maximum width of 0.1 mm., and means for deflecting said diaphragm.

8. In a light valve in combination, a source of light, a reflecting diaphragm for receiving light from said light source, means for deflecting said diaphragm, light absorbing means positioned adjacent that portion of said diaphragm having the least amount of deflection, a light concentrating means for focusing the light from said reflecting diaphragm, a light obturator for receiving said focused light beam, said focused light beam and said obturator having a maximum width of 0.1 mm.

9. In a light valve, the combination as defined by claim 8 in which the focused light beam and the obturator are of substantially equal width.

10. In a light valve, in combination, a light source, means for subdividing said light source into a plurality of light beams, a reflecting diaphragm for receiving said plurality of light beams, a light concentrating means for focusing the light beams from said reflecting diaphragm, a light obturator having a plurality of slots positioned at the conjugate focal plane of said concentrating means, said focused light beams and said obturator slots having a maximum width of 0.1 mm., and means for deflecting said diaphragm.

11. In a light valve, in combination, a light source, a light concentrating reflector, an oppositely disposed reflecting diaphragm for receiving light from said reflector, means on one side of the axis of the light concentrating means for projecting light from said light source on said concentrating reflector, means on the conjugate focal plane of the concentrating reflector for receiving light projected on said reflector from said reflecting diaphragm, said last-named means having a maximum width of 0.1 mm., and means for deflecting said reflecting diaphragm.

12. In a light valve in combination, a source of light, a reflecting diaphragm for receiving light from said light source, a light concentrating means for focusing the light from said reflecting diaphragm, a movable light obturator for receiving said focused light, said focused light beam and said obturator having a maximum width of 0.1 mm., and means for deflecting said diaphragm.

13. In a light valve in combination, a light source, a reflecting diaphragm for receiving light from said light source, a light concentrating means between said light source and said diaphragm, perforated means for subdividing said light on one side of the focal axis of said concentrating means, reflecting means on the other side of said focal axis for receiving light from said subdividing means and reflecting surfaces on said subdividing means for recombining said subdivided light after passage to said reflecting diaphragm, and means for deflecting said diaphragm.

14. In a light valve in combination, a source of light, a reflecting diaphragm for receiving light from said light source, a light concentrating means for forcusing the light from said reflecting diaphragm, a light obturator for receiving said focused light beam and said obturator having a maximum width of 0.1 mm., means for deflecting said diaphragm, and a gas-tight housing means having a variable gas pressure for said light valve.

15. In a light valve in combination, a source of light, a reflecting diaphragm for receiving light from said light source, a light concentrating means for focusing said light from said reflecting diaphragm, an adjustable grid for subdividing the light from said light source, an adjustable obturating means for receiving said focused light, and means for deflecting said diaphragm.

In testimony whereof I affix my signature.

CARL MUELLER.